United States Patent
Ying et al.

(10) Patent No.: US 11,886,372 B1
(45) Date of Patent: Jan. 30, 2024

(54) SYSTEMS AND METHODS FOR PACKING OF TRANSACTION LAYER (TL) PACKETS

(71) Applicant: Cadence Design Systems, Inc., San Jose, CA (US)

(72) Inventors: Claire Liyan Ying, Los Altos Hills, CA (US); Uyen Huynh Ha Nguyen, San Jose, CA (US); Shu Wang, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 32 days.

(21) Appl. No.: 17/375,278

(22) Filed: Jul. 14, 2021

(51) Int. Cl.
*G06F 13/36* (2006.01)
*G06F 13/42* (2006.01)
*G06F 13/38* (2006.01)
*G06F 13/40* (2006.01)

(52) U.S. Cl.
CPC ........ *G06F 13/4221* (2013.01); *G06F 13/382* (2013.01); *G06F 13/4027* (2013.01); *G06F 13/4068* (2013.01)

(58) Field of Classification Search
CPC .............. G06F 13/4221; G06F 13/382; G06F 13/4027; G06F 13/4068
See application file for complete search history.

(56) References Cited

U.S. PATENT DOCUMENTS

| 9,672,148 | B1* | 6/2017 | Michaud | G06F 12/0868 |
| 2020/0012555 | A1* | 1/2020 | Das Sharma | H04L 1/009 |
| 2020/0044895 | A1* | 2/2020 | Mittal | G06F 13/4282 |
| 2020/0145341 | A1* | 5/2020 | Das Sharma | G06F 13/405 |
| 2021/0014177 | A1* | 1/2021 | Kasichainula | H04L 47/6295 |
| 2021/0117340 | A1 | 4/2021 | Trikalinou et al. | |
| 2022/0066636 | A1* | 3/2022 | Taki | G06F 3/0679 |

* cited by examiner

*Primary Examiner* — Henry Tsai
*Assistant Examiner* — Kim T Huynh
(74) *Attorney, Agent, or Firm* — Foley & Lardner LLP (57) ABSTRACT

The present disclosure relates to packing transaction layer (TL) packets at a link layer of a protocol stack. In some examples, channel type data identify a type of message channel for a first TL packet can be generated. A set of slot formats for a slot for packing the first TL packet can be identified based on the channel type data and a slot format database. A respective slot format of the set of slot formats can be selected for the slot based on a message type of the first TL packet, and a message type of a second TL packet. The first TL packet and the second TL packet can be packed into the slot having the selected respective slot format during generation of a link layer packet.

20 Claims, 6 Drawing Sheets

| | 802 | 804 | 806 |
|---|---|---|---|
| | H0 | CXL.cache Req + CXL.cache Resp | 96 |
| | H1 | CXL.cache Data Header + 2 CXL.cache Resp | 88 |
| | H2 | CXL.cache Req + CXL.cache Data Header | 88 |
| | H3 | 4 CXL.cache Data Header | 96 |
| | H4 | CXL.mem RwD Header | 87 |
| | H5 | CXL.mem Req Only | 87 |
| | H6 | MAC slot used for link integrity. | 96 |
| | G0 | CXL.cache/ CXL.mem Data Chunk | 128 |
| | G1 | 4 CXL.cache Resp | 128 |
| | G2 | CXL.cache Req + CXL.cache Data Header + CXL.cache Resp | 120 |
| | G3 | 4 CXL.cache Data Header + CXL.cache Resp | 128 |
| | G4 | CXL.mem Req + CXL.cache Data Header | 111 |
| | G5 | CXL.mem RwD Header + CXL.cache Resp | 119 |

FIG. 8

| | 902 | 904 | 906 |
|---|---|---|---|
| | H0 | CXL.cache Data Header + 2 CXL.cache Resp + CXL.mem NDR | 87 |
| | H1 | CXL.cache Req + CXL.cache Data Header | 96 |
| | H2 | 4 CXL.cache Data Header + CXL.cache Resp | 88 |
| | H3 | CXL.mem DRS Header + CXL.mem NDR | 70 |
| | H4 | 2 CXL.mem NDR | 60 |
| | H5 | 2 CXL.mem DRS Header | 80 |
| | H6 | MAC slot used for link integrity. | 96 |
| | G0 | CXL.cache/ CXL.mem Data Chunk | 128 |
| | G1 | CXL.cache Req + 2 CXL.cache Resp | 119 |
| | G2 | CXL.cache Req + CXL.cache Data Header + CXL.cache Resp | 116 |
| | G3 | 4 CXL.cache Data Header | 68 |
| | G4 | CXL.mem DRS Header + 2 CXL.mem NDR | 100 |
| | G5 | 2 CXL.mem NDR | 60 |
| | G6 | 3 CXL.mem DRS Header | 120 |

SYSTEMS AND METHODS FOR PACKING OF TRANSACTION LAYER (TL) PACKETS

TECHNICAL FIELD

The present disclosure relates to systems and methods for packing transaction layer (TL) packets at a link layer of a protocol stack. More specifically, the present disclosure relates to packing of compute express Link™ (CXL) messages at the link layer.

BACKGROUND

Peripheral Component Interconnect (PCI) Express (PCIe) is high-speed serial computer expansion bus standard. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high-performance, general-purpose input-output (I/O) interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

With advancements in computing systems and performance, improvements to interconnect fabric and link implementations continue to be developed, including interconnects based on or utilizing elements of PCIe or other legacy interconnect platforms. A CXL has been developed, providing an improved, high-speed interconnect designed to accelerate next-generation data center performance, among other applications. CXL is built on the PCIe physical and electrical interface with protocols in three key areas: input/output, memory, and cache coherence. The CXL standard leverages a PCIe physical layer and electricals and provides low latency paths for memory access and coherent caching. CXL is designed to provide a standard interface for high-speed communications in support of emerging computing applications, such as artificial intelligence, machine learning, and other applications.

SUMMARY

The present disclosure relates to systems and methods for packing TL packets.

In an example, a channel arbitration method can include generating channel type data identifying a type of message channel for a first message, identifying a set of slot formats for a slot for packing a first TL packet based on an evaluation of the channel type data relative to a slot format database, determining an availability of a second TL packet for packing into the slot, selecting a respective slot format of the set of slot formats for the slot based on a message type of the first TL packet and a message type of the second TL packet, and packing the first TL packet and the second TL packet into the slot having selected respective slot format during generation of a LL packet.

In yet another example, a system can include a processor and a protocol stack. The protocol stack can be configured to receive first and second messages from the processor, generate first and second TL packets based on respective first and second messages, select a respective slot format of a set of slot formats for a respective slot based on a message type of the first and second TL packets, and generate a flit comprising a set of slots. The set of slots can include the respective slot having the respective slot format and can be packed with the first and second TL packets. The protocol stack can be configured to transmit the flit across a lane of a link to a receiving device.

In a further example, a protocol stack can include a transaction layer configured to receive first, second, and third messages and packetize the messages to provide first, second, and third TL packets comprising a respective one of the first, second, and third messages. The transaction layer can further include a link layer comprising a channel arbitrator. The channel arbitrator can include a channel scheduler configured to generate channel type data identifying a type of message channel for the first TL packet, and a slot format identifier configured to identify a set of slot formats for a respective slot based on an evaluation of the channel type data relative to a slot format database, determine an availability of one of the second and third TL packets, select a respective slot format of the set of slot formats for the respective slot based on a message type of the first TL packet, and a message type of one of second and third TL packets and generate slot packing data identifying the selected respective slot format and respective TL packets for packing into the respective slot. The respective TL packets can include the first TL packet and one of the second and third TL packets. The channel arbitrator can further include a packet generator configured to generate a LL packet that includes a set of slots that include the respective slot having the selected respective slot format. The packet generator being configured during the generation of the LL packet to pack the first TL packet and one of the second and third TL packets into the respective slot based on the slot packing data.

DETAILED DESCRIPTION

The present disclosure relates to systems and methods for packing TL packets. Interconnect architectures such as protocol stacks implemented using CXL are employed to enable devices in a computing system to communicate with each other. A CXL protocol stack that includes a transaction layer, a link layer (also known as a data link layer), and a physical layer can be employed at each device. Packets can be formed at the transaction and data link layers of a transmitting device to carry information (referred to as messages) from the transmitting device to a receiving device. As a packet flows through other layers at the transmitting device, the packets can be extended with additional information for handling those packets at those layers. The physical layer of the transmitting device can generate symbols representative of the packets and transmit the symbols to the receiving device. At the receiving device, a reverse process occurs and the symbols get transformed from a physical layer up the CXL protocol stack to a link layer representation, which passes the transformed data in a transaction layer packet form to the transaction layer of the receiving device.

Existing packing methods at the transaction layer of a CXL protocol stack are configured to pack TL packets into different slots during LL packet generation. For example, during a slot arbitration method, respective TL packets provided by the transaction layer with messages are packed into different slots of a set of slots that can collectively be formed during LL packet generation to provide or represent a LL packet. During the slot arbitration method, a weighted round-robin (WRR) module is configured to determine a slot format for each of the slots for packing the slots with available TL packets. In other existing packing approaches, packing rules are used to arbitrate packing of the TL packets into slots during LL packet generation. Thus, existing packing methods loosely pack TL messages and fill remaining data fields of slots in which the TL packets are packed with zeros.

Systems and methods are described herein for tightly packing TL messages during LL packet generation. Because the systems and methods as described herein tightly pack the TL packets during LL packet generation a data transfer efficiency of a data link (e.g., a CXL link) can be improved. In some examples, a channel arbitrator can be employed at the link layer. The channel arbitrator can be configured to seamlessly pack TL messages during LL packet generation without idle data stuffing (e.g., packing data fields with zeros) for multiple pending message transmissions according to the system and methods described herein. Moreover, by tightly packing the TL packets according to the systems and methods described herein, provides busy traffic for a device under test (DUT) to allow for verifying that the DUT can process the TL packets within an acceptable latency with the busy traffic.

By way of example, the channel arbitrator can include a channel scheduler that can be configured to generate channel type data identifying a type of message channel for a first message that can be received at the link layer. The channel arbitrator can further include a slot format identifier that can be configured to identify a set of slot formats for a respective slot for use during LL packet generation based on an evaluation of the channel type data relative to a slot format database. The slot format identifier can be configured to determine an availability of one of second and third TL packets and select a respective slot format of the set of slot formats for the respective slot based on a message type of the first message and a message type of one of second and third messages. The slot format identifier can be configured to generate slot packing data identifying the selected respective slot format and respective TL packets for packing into the respective slot. The respective TL packets can include the first TL packet and one of the second and third TL packets.

By way of further example, the slot format identifier can be configured to generate a priority request identifying first and second message channels for the second and third messages. The priority request can be provided to the channel scheduler. The channel scheduler can be configured to generate channel priority data identifying one of the second and third message channels as having a greater channel priority than a remaining message channel of the second and third message channels. In some examples, the slot format database can include a first slot format associated with the message type of the second message and a second slot format associated with the message type of the third message. The message type of the first message can be associated with both of the first and second slot formats in the slot format database. The slot format identifier can be configured to select the first slot format as the respective slot format based on the message type of the first and second message and the priority data identifying the first message channel having a greater priority than the second message channel. In other examples, the slot format identifier can be configured to select the first slot format as the respective slot format based on the message type of the first and second message and the priority data identifying the second message channel having a greater priority than the first message channel.

In some examples, the channel arbitrator can include a packet generator. In other examples, the packet generator can be located separately from the channel arbitrator at the link layer. The packet generator can be configured to generate a LL packet with the first TL packet and one of the second and third TL packets packed into the respective slot having the selected respective slot format based on the slot packing data. Accordingly, by using the channel arbitrator at the link layer, as described herein, CXL messages (e.g., cache and/or memory messages) can be seamlessly packed (e.g., more tightly packed), thereby improving the data transfer efficiency of the link. While examples are presented herein for packing TL packets having CXL messages, the examples herein should not be limited or construed as only applying to CXL messaging packing. In other examples, TL packets having different message types can be packed into a respective slot during LL packet generation.

Figure 1:
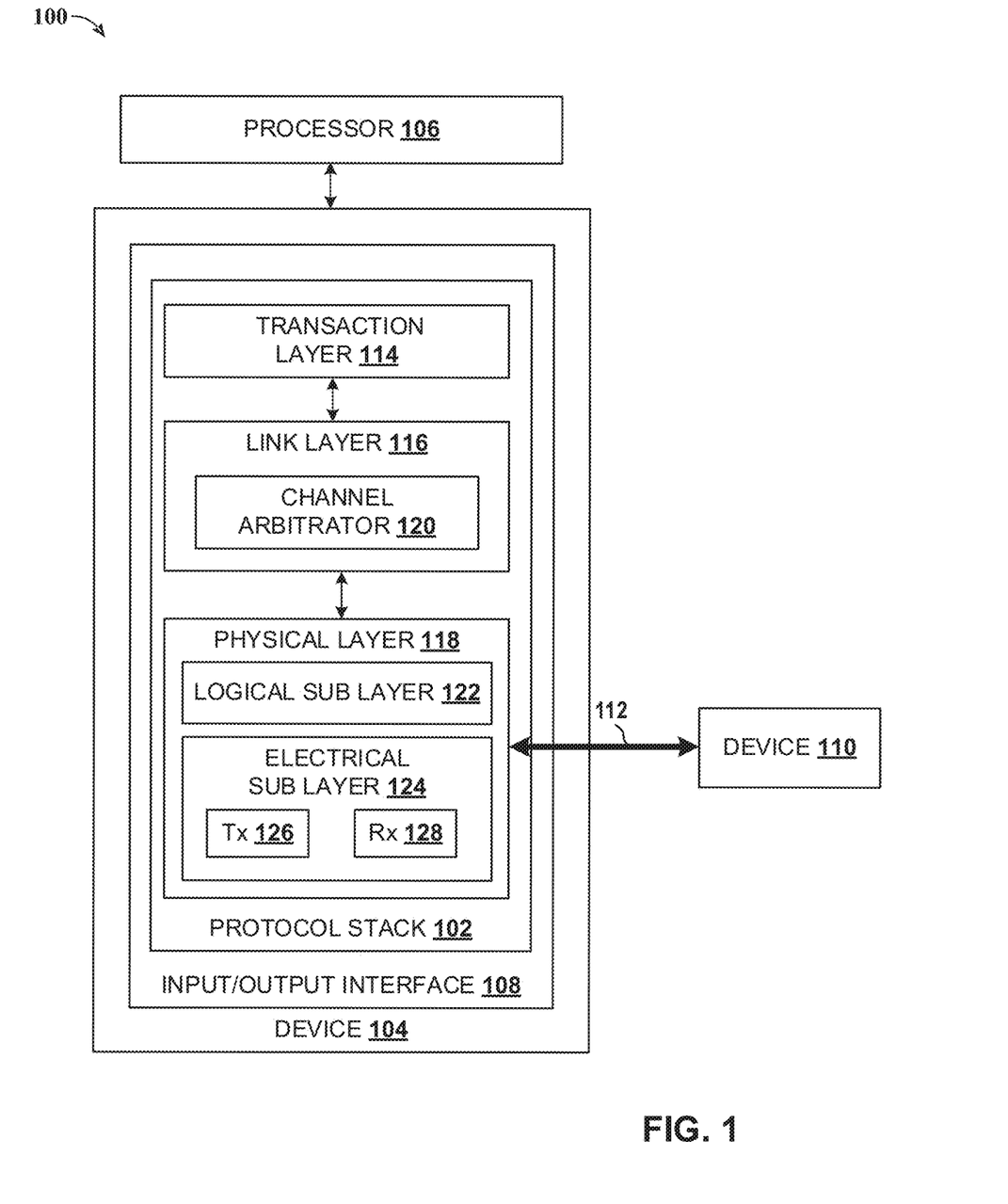
FIG. 1 is an example of a system including an interconnect architecture.

FIG. 1 is an example of a system 100 including an interconnect architecture. The interconnect architecture can include a protocol stack 102. The protocol stack 102 can be implemented on a device 104. The term "device" as used herein can refer to any device that can be configured to support the protocol stack 102. In some examples, the device 104 can be configured to communicate with a processor 106. The processor 106 can be representative of a processing element. Thus, the processor 106 can be a microprocessor, a host processor, an embedded processor, a co-processor, processor core, or another type of processor. In some examples, the processor 106 can be connected to the device 104, as shown in the example of FIG. 1 using bidirectional arrows. In an example, the processor 106 can be connected to the device 104 via a serial point-to-point interconnect, a differential point-to-point interconnect, or another interconnect scheme. While the example of FIG. 1 illustrates the device 104 as being separate from the processor 106, in some examples, the processor 106 can include the device 104. In some examples, a portion or all of the functionality of the device 104 can be integrated into the processor 106.

In some examples, the device 104 can include one or more I/O interfaces 108 for implementing a respective instance of the protocol stack 102. Each I/O interface 108 can include or be representative of input and output ports that enable the device 104 (or the processor 106, in some examples) to send and receive information with other devices, such as the processor 106 and/or a device 110. The device 110 can include one or more I/O interfaces having a respective protocol stack that can be configured to operate in a same or similar manner as the protocol stack 102, as described herein. While the example of FIG. 1 illustrates the device 104 with one or more I/O interfaces 108, in other examples, the device 104 can include any number of I/O interfaces based on an application (e.g., layout, architecture, systems, etc.) for communicating information to and from devices to which the device 104 can be coupled.

In some examples, the device 104 can be connected to the device 110 by a communication channel 112. The communication channel 112 can be used to establish a link between the devices 104 and 110, such as a CXL link. In some examples, the processor 106 can include the one or more I/O interface 108 and can be coupled via the communication channel 112 to the device 110. In examples wherein the one or more I/O interfaces 108 are embodied in the processor 106, the device 104 may be omitted. In some examples, the one or more I/O interfaces 108 can be representative of ports. The communication channel 112 can include one or more extension devices, such as retimes and repeaters. The link may conform to a communication standard (e.g., a CXL standard). A link can be a serial point-to-point communication link that allows ports at ends of the link to send and receive information (referred to as messages).

Thus, at a physical level, a link can include one or more lanes. A lane can include two differential wire pairs, one receiving and transmitting pair, and thus one lane can include four (4) wires. By way of example, an "x4" link can include 4 lanes (e.g., 16 wires), an "x16" link can include 16 lanes (e.g., sixty-four (64) wires), and an "x32" link can include 32 lanes (e.g., 128 wires). For example, to scale bandwidth, a link may aggregate multiple lanes denoted by xN, wherein N is any supported link width, such as 1, 2, 4, 8, 12, 16, 32, 64, or wider. In other examples, the communication channel 112 can include a greater or fewer number of lanes as described herein. In some examples, the lane of the communication channel 112 can refer to any path for transmitting information, such as a transmission line, a copper line, an optical line, a wireless communication channel, an infrared communication link (or channel), or another type of communication path.

In some examples, the devices 104 and 110 can be representative of one of a controller hub (e.g., root complex, such as a PCIe root complex), an end point device, a peripheral card, a switch, an I/O device, a network interface controller (NIC) device, a graphic card, a graphic processing unit (GPU), an accelerator, an audio processor, a network processor, hard-drive, a solid-state drive (SSD), a flash memory device, another type of storage device, a CD/DVD ROM, a monitor, a printer, a mouse, a keyboard, a router, a portable storage device, a Firewire device, a Universal Serial Bus (USB) device, a scanner, a computing system, and a bridge (e.g., a PCI/PCI-X bridge (a peripheral connection interface/peripherical connection extended interface)).

In some examples, the processor 106 and the devices 104 and/or 110 can be implemented as chips or dies that can be enabled to communicate among each other. In some examples, the processor 106 and the devices 104 and/or 110 can be implemented on a multichip package, which can be an electronic package where multiple integrated circuits (ICs), semiconductor dies, or other discrete components are packaged onto a unifying substrate (e.g., silicon substrate or other semiconductor substrate type). In some examples, the processor 106 and the devices 104 and 110 can be implemented on respective ICs. In further examples, the processor 106 and the device 104 and/or 110 can be implemented on a system on a chip (SoC), multiprocessor chip, etc.

In some examples, the device 104 can be implemented as a controller hub and can be coupled to a memory, which can be represented as the device 110 in the example of FIG. 1. The memory can include any memory device, such as random-access memory (RAM), non-volatile memory (such as, for example, phase-change memory), or other memory that can be made accessible to the device 104. The device 104 can be coupled to memory by a memory interface that can be one of a double data rate (DDR) memory interface, a quad data rate (QDR) memory interface, a dual-channel DDR memory interface, a dynamic RAM memory interface, or any other memory interface based on a memory type. In examples wherein the device 104 is implemented as the controller hub, such as for a computing system (e.g., a computer, a portable device, etc.), the device 104 can include a chipset, a platform controller hub (PCH), memory controller hub (MCH), a northbridge, an interconnect controller hub (ICH), a south bridge, or a root controller/hub. The term chipset as used herein can refer to two or more physically separate controller hubs, such as an MCH coupled to an ICH in a two-controller hub chipset configuration.

In some examples, the device 104 can be implemented as a switch and can be configured to route messages from the device 110 upstream to another device (e.g., a controller hub, which can route the messages to the processor 106), or to the processor 106. In examples wherein the device 104 is implemented as the switch, the device 104 can be configured to route messages downstream from the processor 106 or the other device (e.g., the controller hub) to the device 110. Thus, in some examples, the device 104 can be connected directly to the communication channel 112 or by another device (e.g., the switch) to the device 110. In some examples, the device 110 can be referred to as a PCIe end-point device. The PCIe end-point device can be representative of a legacy PCIe or a root complex integrated endpoint.

Continuing with the example of FIG. 1, the protocol stack 102 can include a transaction layer 114, a link layer 116, and a physical layer 118. In some examples, the one or more I/O interfaces 108 can be referred to as a module, circuitry, or port implementing or including the protocol stack 102. Thus, in some examples, the layers 114, 116, and 118 can be represented as respective module layers and/or respective circuitry layers. As such, in some examples, the protocol stack 102 can be referred to as protocol stack circuitry or a protocol stack module. In some examples, the protocol stack 102 can be a combination of software, firmware, and hardware within a semiconductor component, such as IC to enable a semiconductor device to communicate with another semiconductor device (e.g., the device 110 in examples wherein the device 110 is implemented as a semiconductor component).

In some examples, the processor 106 can be configured to generate messages. The device 104 can be configured to communicate the messages to the device 110. In some examples, the messages can be generated by software executing on the processor 106. The software can be various types of software that can execute on the processor 106. For example, the software can include an operating system (OS) software, firmware, application software, etc. The messages that are to be communicated to the device 110 can pass through the layers 114, 116, and 118 and processed at each layer to condition the messages for transmission across the link to the device 110 using the communication channel 112.

In some examples, the one or more I/O interfaces 108 can be configured to support a CXL link, and the protocol stack 102 can be implemented as a CXL protocol stack. Thus, in some examples, the protocol stack 102 can enable communication between a host (e.g., the processor 106, as shown in the example of FIG. 1) and a set of workload accelerators. A respective workload accelerator can correspond to the device 110, as shown in example of FIG. 1. By way of example, the set of workload accelerators can include GPUs, field-programmable gate array (FPGA) devices, tensor processor units, vector processor units, machine learning accelerators, purpose-built accelerator solutions, and other types of workload accelerators.

In some examples, the protocol stack 102 can enable a host processor (e.g., the processor 106, as shown in the example of FIG. 1) to communicate with memory, which can be implemented in some examples as the device 110, as shown in the example of FIG. 1. In some examples, the protocol stack 102 can be configured to provide for a high-speed CPU-to-device or CPU-to-memory interconnect that can be based on utilizing elements of an interconnect platform or architecture (e.g., PCIe). The protocol stack 102 can be configured to maintain memory coherency between a CPU memory space and memory on attached devices, which allows resource sharing for higher performance, reduced stack complexity, and lower overall system cost, and among other advantages.

In some examples, the protocol stack 102 can be configured to establish a CXL link between the devices 104 and 110 over the communication channel 112. The CXL link can support dynamic protocol multiplexing of coherency, memory access, and I/O protocols. CXL provides a set of protocols that include I/O semantics that may be similar to PCIe, caching protocol semantics, and memory access semantics over a discrete or on-package link. Based on application, all of the CXL protocols or only a subset of the protocols may be enabled. In some implementations, CXL may be built upon a PCIe infrastructure (e.g., PCIe 5.0), leveraging the PCIe physical and electrical interface to provide advanced protocols in areas including I/O, memory protocol (e.g., allowing a host processor to share memory with an accelerator device), and coherency interface.

The CXL protocol can include a CXL IO (CXL.io) protocol, a CXL cache (CXL.cache) protocol, and a CXL.memory (CXL.mem) protocol. The CXL.io protocol can be a non-coherent load/store interface for I/O devices (e.g., in such examples represented as the device 110, as shown in FIG. 1). Transaction types, transaction packet formatting, credit-based flow control, virtual channel management, and transaction ordering rules in CXL.io may follow all or a portion of a PCIe definition. The CXL.mem protocol can be a transactional interface between the host (e.g., the processor 106, as shown in FIG. 1) and memory, which in some examples can be implemented as the device 110, or coupled to the device 110. The CXL.mem protocol can be used for multiple different memory configurations including when a memory controller for the memory is located in the processor 106 when the memory controller is within an accelerator device (e.g., in such examples represented as the device 110, as shown in FIG. 1), or when the memory controller is moved to a memory buffer chip. The CXL.mem protocol can be used for different memory types (volatile, persistent, etc.) and configurations (flat, hierarchical, etc.). The CXL.cache protocol can be a cache interface that defines interactions between the host (e.g., the processor 106, as shown in FIG.) and the device 110.

In some examples, the processor 106 can include coherence/cache logic representative of a coherency/cache engine and interconnect logic representative of an interconnect engine. In some examples, the CXL.cache and CXL.memory protocols can include respective interfaces representative of cache and memory channels. Each channel can be independently accessed for a transaction (e.g., sending of messages). The cache and memory channels can be established between the coherency/cache engine and the transaction layer such as the transaction layer 114 to send and receive cache and memory messages. By way of example, the cache channels can include three (3) channels in each direction for sending responses, requests, and data, which can be referred to herein as messages.

In some examples, the protocol stack 102 can include circuitry for implementing multiplexing logic to enable multiplexing of CXL protocols (e.g., CXL.io, CXL.cache, and CXL.mem protocols). For example, the link layer 116 or an intermediate layer employed between the link layer 116 and the physical layer 118 can be provided to implement multiplexing of the CXL protocols. Thus, messages of any one of the CXL protocols can be sent in a multiplex manner over the communication channel 112 using the CXL link to the device 110. In some examples, the device 106 can include a Flex Bus™. A Flex Bus port is a flexible high-speed port that can be configured to statically support either a PCIe or a CXL link. In some examples, the one or more I/O interfaces 108 can be implemented as a Flex Bus port. The Flex Bus port in examples wherein the processor 106 includes the device 104 and/or the one or more I/O interfaces 108 can be used to establish the CXL link to the device 110, which in some examples, can be an accelerator (e.g., an FPGA accelerator), or a memory extender device.

By way of example, messages generated at the processor 106 (or in other examples by another device) for the device 110 can be provided to the protocol stack 102. The transaction layer 114 of the protocol stack 102 can be configured to packetize the messages into TL packets. A respective message of the messages is stored as a payload in a respective TL packet. As the TL packets are moved down the protocol stack 102 to the link layer 116 and then to the physical layer 118, the TL packets can be extended with information to handle packets at those layers. The physical layer 118 can be configured to transmit symbols representative of packets over the communication channel 112 to a physical layer of a protocol stack being implemented at the device 110. There, a reverse process can occur, and the information added to the packets as the packets moved down the protocol stack 102 can be removed (e.g., stripped) as the packets move up the protocol stack of the device 110. A transaction layer of the protocol stack of the device 110 can deliver a payload of the packets to a destination (e.g., a processor of the device 110, or other circuitry of the device 110, or another device coupled to the device 110).

In some examples, the transaction layer 114 can be configured to provide an interface between the processor 106 and the link layer 116. In this regard, the link layer 116 can be configured to receive messages from at least one of the three CXL protocols (e.g., that have been enabled) from the processor 106. For example, the coherency/cache engine can be configured to provide cache or memory messages via respective established cache and/or memory channels to the transaction layer 114. The transaction layer 114 can be configured to packetize the messages from the cache and/or memory channels into packets referred to as TL packets and provide the TL packets to the link layer 116. The transaction layer 114 can append TL header information during TL packetization of messages. A packet format for TL packets generated by the transaction layer 114 can be found in a PCIe specification at a PCIe specification website.

In some examples, the link layer 116 can be configured to receive the TL packets. The link layer 116 can be employed to provide reliable data transfer between protocols. A smallest transfer unit at the link layer 116 can be referred to as a flit, in some examples, and can have a specified number of bits, such as 192 bits or some other denomination. The link layer 116 can rely on the physical layer 118 to frame physical layers unit of transfer into link layers unit of transfer (flit). As described herein, the link layer 116 can include a channel arbitrator 120 that can be configured to provide LL packets with TL packets packed at respective slots of LL packet during LL packet generation.

The channel arbitrator 120 can be configured to pack TL packets having messages (e.g., a response, a request, or data) that have been provided according to a similar protocol into a respective slot of a set of slots during LL packet generation. As described herein, the channel arbitrator 120 can be configured to generate LL packets with TL packets packed into a respective slot of a set of slots of the LL packet. By packing TL packets with messages provided according to a similar protocol (e.g., the CXL.mem or CXL.cache protocols) improves a data transfer efficiency of the link (e.g., the CXL link) across the communication channel 112. Thus, the channel arbitrator 120 can pack more TL packets into a respective LL packet during LL packet generation thereby tightly packing the TL packets in contrast to existing TL packing methods. Existing TL packing methods pack TL packets into different slots of a LL packet during LL packet generation and reduce the data transfer efficiency of the link.

For example, to determine which slot of the set of slots of the LL packet that a first TL packet is to be packed into, the channel arbitrator 120 can be configured to identify a slot format for each slot based on channel type data. The channel type data can identify a type of message channel for packing a message. The type of message channels that the channel type data can identify can include cache and memory channels (e.g., request channels, response, and data channels). In other examples, different types of message channels can be identified by the channel type data. In some examples, the channel type data can identify a respective message channel (e.g., a cache request channel).

The channel arbitrator 120 can be configured to determine whether the first TL packet includes a first message (e.g., a CXL.cache Req message) that has been provided via a respective message channel based on the channel type data. For example, if the channel type data identifies a cache request channel, the channel arbitrator 120 can be configured to evaluate the first TL packet to determine whether the first TL packet includes a cache request message. In some examples, the channel arbitrator 120 can be configured to identify a respective slot format for the respective slot for the generation of the LL packet in response to determining that the first TL packet includes the first message provided via the respective message channel.

In some examples, the channel arbitrator 120 can be configured to generate slot packing data identifying the respective slot format for the respective slot that has been determined. In some examples, the slot packing data can identify or include the first TL packet 204 that is to be packed into the respective slot. The channel arbitrator 120 can be configured to construct (e.g., generate) the LL packet based on the slot packing data for each respective slot as identified by the slot packing data. Thus, the channel arbitrator 120 can be configured to generate slot format data for each respective slot of the set of slots that are to be assembled to collectively define or form the LL packet.

In some examples, the channel arbitrator 120 can be configured to receive a subsequent or another TL packet referred to herein as a second TL packet from the transaction layer 114. The channel arbitrator 120 can be configured to evaluate the second TL packet to determine whether the second TL packet contains a second message provided according to a similar protocol as for the first TL packet, and thus can be packed with the first TL packet in the respective slot. For example, the channel arbitrator 120 can be configured to identify the respective slot format for the second message within the second TL packet based on a message type of the second message within the second TL packet. The channel arbitrator 120 can be configured to generate the slot packing data identifying the respective slot format for the respective slot that has been determined for each of the message types of the first and second messages within respective first and second TL packets. In some examples, the slot packing data can identify or include the first and second TL packets that are to be packed into the respective slot. The channel arbitrator 120 can be configured to construct the respective slot of the LL packet such that the respective slot of the LL packet includes the first and second TL packets.

In some examples, the channel arbitrator 120 can be configured to receive a subsequent TL packet after the second TL packet, which can be referred to herein as a third TL packet, which can include a third message. The channel arbitrator 120 can be configured to select one of the second and third TL packets for packing with the first TL packet in the respective slot, as described herein. For example, the channel arbitrator 120 can be configured to evaluate the second and third TL packets to determine whether the second and third TL packets contain a message provided according to a similar protocol as the first TL packet and thus can be packed with the first TL packet in the respective slot. The channel arbitrator 120 can be configured to determine a message type of the second and third messages within the respective second and third TL packets.

In some examples, the channel arbitrator 120 can be configured to identify a respective candidate slot format for each message within a respective one of the second and third TL packets based on a respective message type of the message therein. The channel arbitrator 120 can be configured to identify a set of candidate slot formats based on the respective message type of each message within the respective second and third TL packets. In some examples, the set of candidate slot formats can be associated with the message type of the message within the first TL packet. Thus, a first candidate slot format can be associated with the message type of the message of the first and second TL packets, and a second candidate slot format can be associated with the message type of the message of the first and third TL packets.

The channel arbitrator 120 can be configured to select one of the first and second candidate slot formats as the respective candidate slot format for packing one of the first and second TL packets or the first and third TL packets based on channel priority data. The channel priority data can identify a respective message channel of the message channels for the second and third messages of the respective second and third TL packets having a greatest priority. The channel arbitrator 120 can be configured to generate the slot packing data identifying a corresponding candidate slot format for one of the first and second TL packets or the first and third TL packets as the respective candidate slot format based on the channel priority data.

In some examples, the channel arbitrator 120 can be configured to retrieve the respective TL packets identified in the slot packing data, such as the first and second TL packets or the first and third TL packets. The channel arbitrator 120 can be configured to generate (e.g., construct) the LL packet based on the slot packing data. For example, the channel arbitrator 120 can be configured to construct the LL packet with the respective slot having the respective TL packets therein (e.g., one of the first and second TL packets or the first and third TL packets). While examples are described with respect to FIG. 1 in which the channel arbitrator 120 constructs the LL packet, in other examples, a packet generator as described herein may be employed at the link layer 116 for packetization based at least on the slot packing data. Accordingly, by using the channel arbitrator 120 at the link layer 116, TL packets with messages can be seamlessly packed (e.g., more tightly packed), thereby improving the data transfer efficiency of the link across the communication channel 112.

In some examples, the channel arbitrator 120 (or the packet generator) can be configured to determine a sequence identifier (e.g., an identification number or packet number) for each LL packet, apply an error detection code (e.g., CRC) to calculate a CRC value based on a content of the LL packet. The CRC value can be added as additional content outside of a set of slots but as part of the respective LL packet (e.g., LL flit packet). Thus, the channel arbitrator 120 (or the packet generator) can be configured to generate the LL packet with the packet sequence number and the CRC value packed therein accordingly. For example, a first slot of the set of slots can include the packet sequence number, and a last slot of the set of slots can include the CRC value. The channel arbitrator 120 can be configured to provide (e.g., submit) each LL packet to the physical layer 118 for transmission to the device 110.

In some examples, the physical layer 118 can include a logical sub layer 122 and an electrical sub layer 124 to transmit a data stream that includes LL packets to the device 110. The logical sub layer 122 can be configured to prepare outgoing data, such as each LL packet, for transmission by the electrical sub layer 124. In some examples, the logical sub-layer 122 can be configured to prepare and identify received data, such as provided by the device 110, before passing the data to the link layer 116. The logical sub layer 122 can be configured to frame the LL packets with start transaction data (in some examples other data) and generate framed packets. The framed packets can be transmitted by the electrical sub layer 124 as a data stream to the device 110 using the link over the communication channel 112. The start transaction data can include a sequence number, frame CRC bits, a length of the TL packet, and other information.

In some examples, the electrical sub layer 124 can include a transmitter 126 and a receiver 128. The logical sub-layer 122 can be configured to provide the transmitter 126 with symbols representative of the framed packets. The transmitter 126 can be configured to serialize the symbols to generate the data stream and transmit the serialized symbols using the link to the device 110. In some examples, the device 110 can be configured to generate serialized symbols and transmit the serialized symbols using the established link to the device 104 in a same or similar manner as described herein.

The receiver 128 can be configured to receive the serialized symbols provided by the device 110 and transform the serialized symbols into a bitstream. The bitstream can be de-serialized by the electrical sub layer 124 and supplied to the logical sub layer 122. The logical sub layer 122 can be configured to provide the bitstream up the protocol stack 102 for processing to communicate messages in the bitstream to the processor 106.

Accordingly, by using the channel arbitrator 120 at the link layer 116, cache or memory messages can be seamlessly packed (e.g., more tightly packed), thereby improving the data transfer efficiency of the link established across the communication channel 112. This is because TL packets having cache or memory messages (e.g., a response, a request, or data) that have been provided according to a CXL protocol, such as a CXL.mem and CXL.cache protocols can be packed into a respective slot in contrast to existing TL packing methods which loosely pack cache or memory messages into different slots during LL packet generation.

Figure 2:
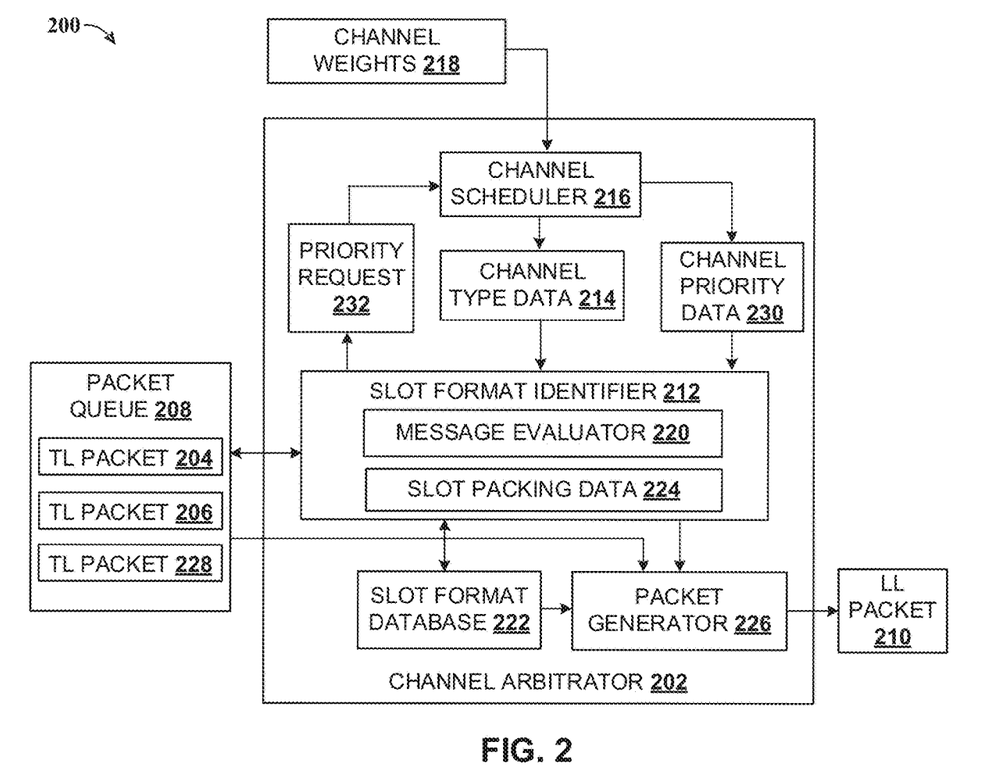
FIG. 2 is an example of a data link layer configured with a channel arbitrator.

FIG. 2 is an example of a link layer 200 configured with a channel arbitrator 202. The link layer 200 can correspond to the link layer 116, as shown in FIG. 1. Therefore, the following description of FIG. 2 can also refer to FIG. 1. The channel arbitrator 202 can correspond to the channel arbitrator 120, as shown in FIG. 1. In some examples, the transaction layer 114 can be configured to provide the TL packets to the link layer 200. As described herein, cache and/or memory channels can be established over which the transaction layer 114 can be configured to receive cache or memory messages. The cache or memory messages can be packetized by the transaction layer 114 to provide TL packets 204 and 206. In some examples, the transaction layer 114 can be configured to store the TL packets 204 and 206 in a packet queue 208 of the link layer 200. The packet queue 208 can be implemented as circuitry or as a module. In other examples, the link layer 200 can be configured to retrieve the TL packets 204 and 206 from the transaction layer 114 for storage at the packet queue 208.

As described herein, the channel arbitrator 202 can be configured to generate a LL packet 210 with the TL packets 204 and 206 packed into a respective slot of a set of slots of the LL packet 210. By packing the TL packets 204 and 206 with cache or memory messages provided according to a similar CXL protocol (e.g., the CXL.mem or CXL.cache protocols) improves a data transfer efficiency of an established link (e.g., the CXL link) across the communication channel 112. Thus, the channel arbitrator 202 can pack more TL packets into a respective LL packet during LL packet generation thereby tightly packing the TL packets in contrast to existing TL packing methods. Existing TL packing methods pack TL packets into different slots of a LL packet during LL generation and thus have a reduced data transfer efficiency in contrast to the examples herein.

For example, to determine which slot of the set of slots of the LL packet 210 that the TL packets 204 and 206 are to be packed into, the channel arbitrator 202 can include a slot format identifier 212. The slot format identifier 212 can be configured to determine a slot format for each slot of the set of slots of the LL packet 210. By way of example, 4 slots can be identified that can be assembled (e.g., combined) as described herein to collectively define or form the LL packet 210. Thus, in some examples, the LL packet 210 can include a header slot, a first generic slot, a second generic slot, and a third generic slot. The slot format identifier 212 can be configured to identify a slot format for each of the 4 slots of the LL packet. The slot format identifier 212 can be configured to identify the slot format for each slot based on channel type data 214.

The channel type data 214 can be generated by a channel scheduler 216 of the channel arbitrator 202. While the example of FIG. 2 illustrates the channel scheduler 216 as being part of the channel arbitrator 202 in other examples the channel scheduler 216 can be separate from the channel arbitrator 202. The channel type data 214 can identify a type of CXL channel for packing a CXL message. The type of CXL channels that the channel type data 214 can identify can include cache and memory channels (e.g., request channels, response, and data channels). In other examples, different types of CXL channels can be identified by the channel type data 214. The channel scheduler 216 can be configured to schedule the different CXL protocols, and thus determine how frequently different CXL messages such as cache and memory messages within respective TL packets are communicated over the established link to the device 110. Thus, the channel scheduler 216 can be configured to determine a rate at which different CXL messages provided according to CXL.cache and/or CXL.memory protocols are packed into LL packets.

In some examples, the channel scheduler 216 can define a schedule for packing the different CXL messages based on channel weights 218. The channel weights 218 can define or establish a priority for different CXL message channels (e.g., the cache and memory channels). Thus, the channel weights 218 can determine a priority for CXL messages whereas some CXL messages may be provided more frequently or less frequently in contrast to other CXL messages to the device 110. In some examples, the channel scheduler 216 can include a WRR algorithm for scheduling the different CXL message channels, and thus packing of the different CXL messages. The channel scheduler 216 can be configured to set weights of the WRR algorithm based on the channel weights 218. The WRR algorithm can be a classical WRR algorithm or an interleaving WRR algorithm.

In some examples, during a first period of time, the channel scheduler 216 can be configured to generate the channel type data 214 identifying a respective CXL message channel (e.g., a cache request channel). In some examples, during the first period of time, the transaction layer 114 can be configured to generate the TL packet 204. The packet queue 208 may not contain the TL packet 206 during the first period of time. The slot format identifier 212 can include a message evaluator 220 to determine whether the TL packet 204 includes a CXL message (e.g., a CXL.cache Req message) provided via the respective CXL message channel based on the channel type data 214. For example, if the channel type data 214 identifies a cache request channel, the message evaluator 220 can be configured to evaluate the TL packet 204 to determine whether the TL packet 204 includes a cache request message. In some examples, the message evaluator 220 can be configured to evaluate header and/or a payload of the TL packet 204 for CXL message channel information identifying a CXL message channel over which the CXL message within the TL packet 204 was provided.

The message evaluator 220 can be configured to evaluate the CXL message channel information of the TL packet 204 relatives to the channel type data 214 to determine whether the TL packet 204 contains a corresponding CXL message. In some examples, the TL packet 204 contains the CXL message that was provided over the respective CXL message channel. In other examples, the TL packet 204 does not contain the CXL message that was provided over the respective CXL message channel. In examples wherein the TL packet 204 does not contain the CXL message that was provided over the respective CXL message channel, the message evaluator 220 can be configured to communicate with the channel scheduler 216 for updated channel type data. The updated channel type data can identify a new CXL message channel (e.g., a memory request channel). The message evaluator 220 can be configured to evaluate the TL packet 204 in a same or similar manner as described herein to determine whether the TL packet 204 contains a CXL message provided via the new CXL message channel.

In some examples, during the first period of time, the slot format identifier 212 can be configured to identify the respective slot format for the respective slot for the generation of the LL packet 210. For example, the slot format identifier 212 can be configured to identify the respective slot format in response to determining that the TL packet 204 contains the CXL message provided via the respective CXL message channel as identified by the channel type data 214. By way of example, during the first period of time, the slot format identifier 212 can be configured to identify the respective slot format for the respective slot for generation of the LL packet 210 based on a CXL message type of the CXL message within the TL packet 204. For example, the slot format identifier 212 can be configured to communicate with a slot format database 222 for identifying the respective slot format.

The slot format database 222 can identify different slot formats for different CXL message types and thus associated CXL message channels. Each slot format identified by the slot format database 222 can specify a number of data fields, bit size of each data field, a type of information that each data field can hold, and other types of information, in some examples. The different slot formats for the different CXL message types identified by the slot format database 222 can be found in a CXL specification at a CXL specification website.

The slot format identifier 212 can be configured to generate slot packing data 224 identifying the respective slot format for the respective slot that has been determined based on the slot format database 222. In some examples, the slot packing data 224 can identify or include the TL packet 204 that is to be packed into the respective slot. The channel arbitrator 202 can include a packet generator 226. The packet generator 226 can be configured to construct (e.g., generate) the LL packet 210 based on the slot packing data 224 for each respective slot as identified by the slot packing data 224. Thus, the slot format identifier 212 can be configured to generate slot format data 224 for each respective slot of the set of slots that are to be assembled to collectively define or form the LL packet 210. By way of example, each slot for constructing the LL packet 210 can have a byte length as specified by a respective slot format. For example, each slot of the set of slots can be 16 bytes, wherein each byte is 8 bits. Thus, each slot can be represented as a set of bits, such as 128 bits. In examples wherein each slot is 16 bytes, the LL packet 210 can be 528 bits (e.g., four (4) slots each 128 bits and two (2) bytes for CRC).

In some examples, during a second period of time, the packet queue 208 can be configured to receive the TL packet 206 from the transaction layer 114. Thus, in some examples, during the second period of time, the TL packet 206 can become available to the channel arbitrator 202 (e.g., be stored at the packet queue 208). The slot format identifier 212 can be configured to communicate with the packet queue 208 for the TL packet 206 in response to identifying the slot format for the respective slot based on the slot format database 222. The slot format identifier 212 can be configured to evaluate the TL packet 206 to determine whether the TL packet 206 contains a CXL message provided according to a similar CXL protocol provided as the TL packet 204, and thus can be packed with the TL packet 204 in the respective slot.

For example, the slot format identifier 212 can be configured to identify the respective slot format for the CXL message within the TL packet 204 based on a CXL message type of the CXL message within the TL packet 206. The slot format identifier 212 can be configured to compare the CXL message type of the CXL message within the TL packet 206 to the slot format database 222 to identify the respective slot format for the respective slot. As described herein, different CXL message types can be associated with a respective slot format within the slot format database 222. Thus, in some examples, the CXL message type of the CXL messages within the TL packets 204 and 206 can be associated with a similar slot format in the slot format database 222.

The slot format identifier 212 can be configured to generate the slot packing data 224 identifying the respective slot format for the respective slot that has been determined based on the slot format database 222 for each of the CXL message types of the CXL message within the respective TL packets 204 and 206. In some examples, the slot packing data 224 can identify or include the TL packets 204 and 206 that are to be packed into the respective slot. The packet generator 226 can be configured to construct the respective slot of the LL packet 210 such that the respective slot of the LL packet 210 includes the TL packets 204 and 206.

In some examples, during the second period of time, the packet queue 210 208 be configured to receive a TL packet 228 from the transaction layer 114. Thus, in some examples, during the second period of time, the TL packet 228 can become available to the channel arbitrator 202 (e.g., be stored at the packet queue 208). The slot format identifier 212 can be configured to communicate with the packet queue 208 to retrieve or receive the TL packet 228. Because in some examples during the second period of time two TL packets 206 and 228 can be received, the channel arbitrator 202 can be configured to select one of the TL packet 206 and 228 for packing with the TL packet 204 in the respective slot, as described herein.

For example, the slot format identifier 212 can be configured to evaluate the TL packet 206 and 228 to determine whether the TL packets 206 and 228 contain a CXL message provided according to a similar CXL protocol as the TL packet 204 and thus can be packed with the TL packet 204 in the respective slot. The slot format identifier 212 can be configured to determine a CXL message type of the CXL message within each of TL packets 206 and 228. For example, the slot format identifier 212 can be configured to identify a respective candidate slot format for each CXL message within a respective TL packet 204 and 228 based on a respective CXL message type of the CXL message therein.

The slot format identifier 212 can be configured to compare the respective CXL message type of each CXL message within the respective TL packets 204 and 228 to the slot format database 222 to identify a set of candidate slot formats. In some examples, the set of candidate slot formats can be associated with the CXL message type of the CXL message within the TL packet 204. Thus, a first candidate slot format can be associated with the CXL message type of the CXL message of the TL packets 204 and 206, and a second candidate slot format can be associated with the CXL message type of the CXL message of the TL packets 204 and 228.

The slot format identifier 212 can be configured to select one of the first and second candidate slot formats as the respective slot format for packing one of the TL packets 204 and 206 or the TL packets 204 and 228 based on channel priority data 230. The channel priority data 230 can be generated by the channel scheduler 216. For example, the slot format identifier 212 can be configured to generate a priority request 232 in response to determining or identifying CXL message channels over which each of the CXL messages within the TL packets 206 and 228 had been provided. The priority request 232 can identify the CXL message channels over which each of the CXL messages within the TL packets 206 and 228 had been provided. The channel scheduler 216 can be configured to determine which CXL channel identified in the priority request 232 has a greatest priority. The channel scheduler 216 can be configured to generate the channel priority data 230 identifying a respective CXL message channel of the CXL message channels identified in the priority request 232 having the greatest priority.

The slot format identifier 212 can be configured to generate the slot packing data 224 identifying a corresponding candidate slot format for one of the TL packets 204 and 206 or the TL packets 204 and 228 as the respective slot format based on the channel priority data 230. In some examples, the packet generator 226 can be configured to retrieve the respective TL packets identified in the slot packing data 224, such as the TL packets 204 and 206, or in some examples, the TL packets 204 and 228. The packet generator 226 can be configured to construct the LL packet 210 based on the slot packing data 224. For example, the packet generator 226 can be configured to construct the LL packet 210 with the respective slot having the respective TL packets (e.g., one of the TL packets 204 and 206 or the TL packets 204 and 228) therein.

By way of example, the CXL message of the TL packet 204 is a CXL.cache Req, the CXL message of the TL packet 206 is CXL.cache Resp, and the CXL message of the TL packet 228 is CXL.cache Data Header. Thus, the CXL.cache Req can be provided via a cache request channel, the CXL.cache Resp can be provided via a cache response channel and the CXL.cache Data Header can be provided via a cache data channel. By way of further example, if the channel priority data 230 indicates that the cache response channel has a greater CXL message channel priority than the cache data channel, the TL packets 204 and 206 can be packed together into the respective slot during LL packet generation by the packet generator 226. By way of further example, if the channel priority data 230 indicates that the cache data channel has a greater CXL message channel priority than the cache response channel, the TL packets 204 and 228 can be packed together into the respective slot during LL packet generation by the packet generator 226. Accordingly, by using the channel arbitrator 202 at the link layer 200, CXL messages can be seamlessly packed (e.g., more tightly packed), thereby improving the data transfer efficiency of the established link across the communication channel 112.

Figure 3:
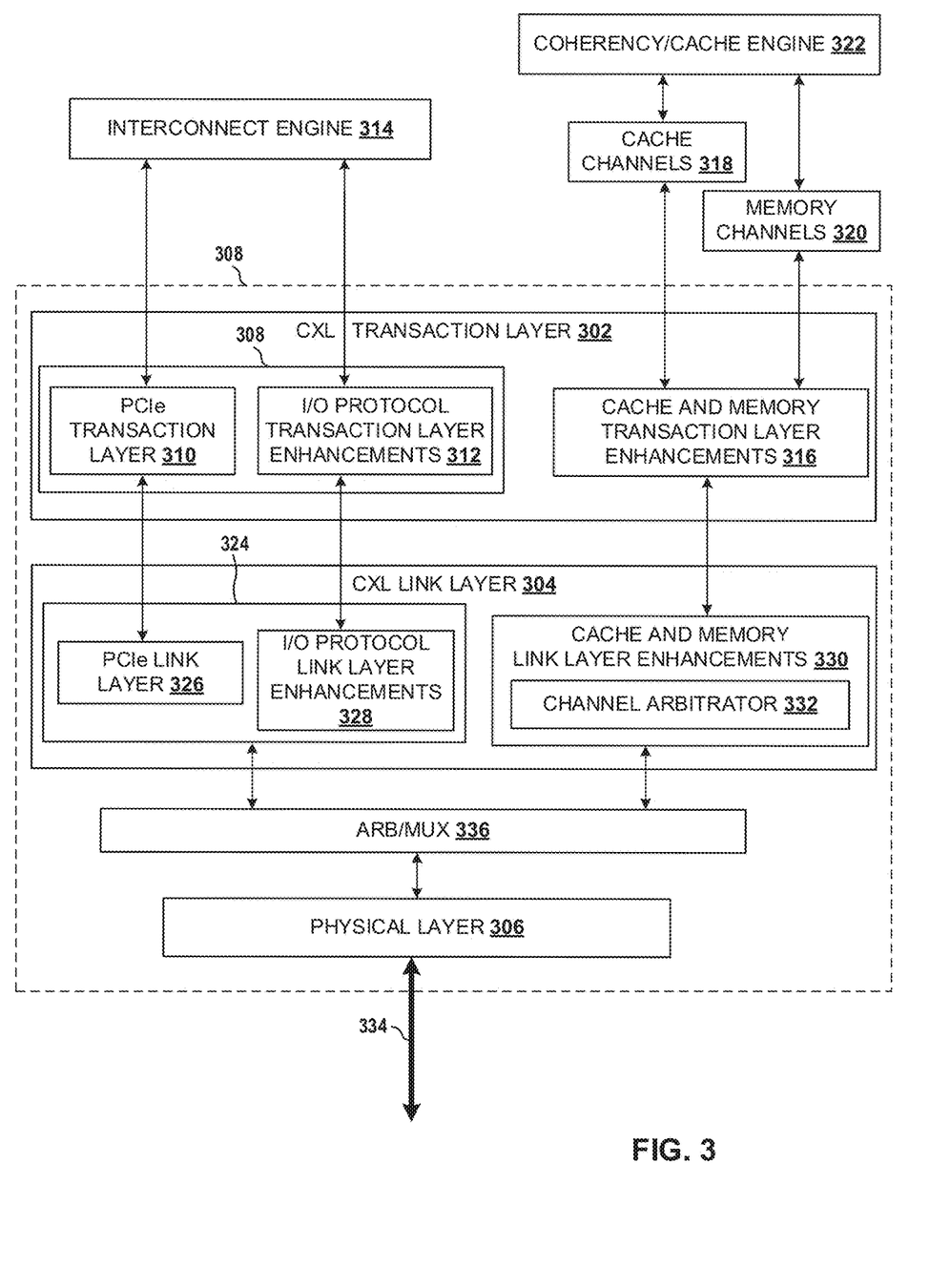
FIG. 3 is an example of a CXL protocol stack.

FIG. 3 is an example of a CXL protocol stack 300. In some examples, the CXL protocol stack 300 can be the protocol stack 102, as shown in FIG. 1. Therefore, the following description of FIG. 3 can also refer to FIGS. 1-2. The CXL protocol stack 300 can be implemented in an interconnect architecture (e.g., a Flex Bus architecture) that can be utilized to implement CXL links. For example, the interconnect architecture can be organized as multiple layers to implement multiple protocols that can be supported by an I/O interface (e.g., the I/O interface 108, as shown in FIG. 1). In some examples, the I/O interface is a Flex Bus port. For example, the CXL protocol stack 300 can include a CXL transaction layer 302, a CXL link layer 304, and a physical layer 306 (e.g., that can be implemented all or in-part in circuitry). In some examples, the CXL transaction layer 302 is the transaction layer 114, the CXL link layer 304 is the link layer 116, and the physical layer 306 is the physical layer 118, as shown in FIG. 1.

The CXL transaction layer 302 can include a base PCIe transaction layer 308 that includes a PCIe transaction layer 310 and I/O protocol transaction layer enhancements 312. The I/O protocol transaction layer enhancements 312 can be used for implementing the CXL.io protocol and thus provide an interface for I/O devices, such as a non-coherent load/store interface. The CXL.io protocol can be an enhanced version of a PCIe protocol (e.g., a PCIe 5.0 protocol) that can be implemented by the PCIe transaction layer 310. The CXL.io protocol can be used for initialization, link-up, device discovery, and enumeration, and register access. The I/O protocol transaction layer enhancements 312 can communicate with an interconnect engine 314 bidirectionally to receive and transmit CXL.io messages. The CXL.io messages received from the interconnect engine 314 can be packetized and passed down the CXL protocol stack 300 to the CXL link layer 304 for further processing. The interconnect engine 314 can be executed on the processor 106, as shown in FIG. 1.

In some examples, the CXL transaction layer 302 can include cache and memory transaction layer enhancements 316 that can implement cache (e.g., CXL.cache) and memory (e.g., CXL.mem) protocols for a CXL link. The cache and memory transaction layer enhancements 316 can be used for implementing the CXL.cache and CXL.mem protocols. The CXL.cache protocol can define interactions between a host (e.g., the processor 106, as shown in FIG. 1) and a device (e.g., the device 110, as shown in FIG. 1), enabling such devices to efficiently cache host memory (e.g., within the processor 106 or external to the processor 106) with low latency using a request and response approach. The CXL.mem protocol can define interactions between the host (e.g., the processor 106, as shown in FIG. 1) and memory attached to a device, such as the device 110, as shown in FIG. 1, in some examples. The CXL.mem protocol can enable the host to access the memory of the attached device using load and store commands, with the host acting as a master and the device acting as a subordinate, which can support both volatile and persistent memory architectures. While the example of FIG. 3 illustrates the CXL.cache and CXL.mem protocol sharing common transaction and link layers 302 and 304, in other examples, a different sharing scheme can be used. For instance, in some examples, the CXL.cache and CXL.mem protocols can share common transaction and link layers 302 and 304 while the CXL.io protocol has its own link and transaction layers.

In some examples, the CXL.cache and CXL.mem protocols can include respective interfaces representative of cache and memory channels 318 and 320, as shown in FIG. 3. Each of the cache and memory channels 318 and 320 can establish or provide a message path between a coherency/cache engine 322 and cache and memory transaction layer enhancements 316. The cache and memory transaction layer enhancements 316 can communicate messages using the cache and memory channels 318 and 320 with the coherency/cache engine 322 bidirectionally to receive and transmit CXL.cache and/or CXL.mem messages, which can include requests, responses, and data. For example, the cache channels 318 can include a first set of channels that include a first response channel, a first request channel, and a first data channel. In some examples, the memory channels 320 can include a second set of channels that include a second response channel, a second request channel, and a second data channel. The coherency/cache engine 322 can be executed on the processor 106, as shown in FIG. 1.

The coherency/cache engine 322 can be configured to communicate a CXL.cache message based on a type of CXL.cache message via one of the channels of the first set of channels. For example, if the CXL.cache message is a CXL.cache response message (e.g., CXL.cache Resp), the coherency/cache engine 322 can be configured to communicate the CXL.cache response message using the first response channel of the first set of channels of the cache channels 318. The cache and memory transaction layer enhancements 316 can be configured to communicate to the coherency/cache engine 322 a CXL.cache message based on a type of CXL.cache message via one of the channels of the second set of channels.

In some examples, the cache and memory transaction layer enhancements 316 can be configured to packetize received messages from the coherency/cache engine 322 into TL packets, such as the TL packets 204, 206, and 228, as shown in FIG. 2. The cache and memory transaction layer enhancements 316 can pass the TL packets to the CXL link layer 304. In some examples, the CXL link layer 304 can include a base PCIe link layer 324 that includes a PCIe link layer 326 and I/O transaction layer enhancements 328 (e.g., for CXL.io), which can be an enhanced version of the PCIe link layer 326. The base PCIe link layer 324 can be configured to process the packets from the base PCIe link layer 308 and append additional information to the packets to generate I/O packets. The I/O packets can be passed further down the CXL protocol stack 300 for further processing.

As shown in the example of FIG. 3, the CXL link layer 304 can include cache and memory link layer enhancements 330 (e.g., for CXL.cache and CXL.mem). In some examples, the CXL link layer 304 can include a channel arbitrator 332. While the example of FIG. 3 illustrates the channel arbitrator 324 as part of the cache and memory link layer enhancements 330 in other examples, the channel arbitrator 332 can be separate from the cache and memory link layer enhancements 330. In some examples, the channel arbitrator 332 is the channel arbitrator 120, as shown in FIG. 1, or the channel arbitrator 202, as shown in FIG. 2. Thus, the channel arbitrator 332 can be configured to generate LL packets with TL messages that include CXL.cache and CXL.mem messages that have been packed seamlessly and thereby improving a data transfer efficiency of a CXL link 334 established across a communication channel (e.g., the communication channel 112, as shown in FIG. 1) with the device 110, as shown in FIG. 1. Because the channel arbitrator 332 packs the TL messages seamlessly according to the systems and methods described herein, the TL messages can be more tightly packed, such that messages provided according to the CXL.mem and CXL.cache protocols can be packed into a respective slot of the LL packet (e.g., the LL packet 210, as shown in FIG. 2). Thus, the data transfer efficiency of the CXL link 334 can be enhanced by the channel arbitrator 332.

In some examples, the CXL protocol stack 300 can include a CXL arbitrator/multiplexor (ARB/MUX) 336. The CXL link layer 304 can interface with the CXL ARB/MUX 336. The CXL ARB/MUX 336 can implement arbitration and multiplexing logic and thus interleave traffic from two logic streams (e.g., I/O LL packets and CacheMem LL packets), among other example implementations. The interleaved traffic can be provided to the physical layer 306, which can be configured similar to the physical layer 118 as shown in FIG. 1 to communicate the interleaved traffic across the CXL link 334 to the other device 110.

By way of further example, during link training, CXL the transaction and link layers 302 and 304 can be configured to operate in either PCIe mode or CXL mode. In some instances, a host (e.g., the processor 106, as shown in FIG. 1) may support the implementation of either PCIe or CXL mode, while other devices, such as accelerators, may only support CXL mode, among other examples. In some examples, a port (e.g., a Flex Bus port) may utilize the physical layer 306 based on a PCIe physical layer (e.g., a PCIe electrical PHY). For instance, a Flex Bus physical layer may be implemented as a converged logical physical layer at the physical layer 306 that can operate in either PCIe mode or CXL mode based on results of alternate mode negotiation during the link training process. In some examples, the physical layer 306 may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the CXL protocol stack 300 may be fully compliant with native PCIe features (e.g., as defined in the PCIe specification), while in CXL mode, the CXL link 334 supports all features defined for CXL. Accordingly, in some examples, a Flex Bus port may employ the CXL protocol stack 300 and provide a point-to-point interconnect that can transmit native PCIe protocol data or dynamic multi-protocol CXL data to provide I/O, coherency, and memory protocols, over PCIe electricals, among other examples.

Figure 4:
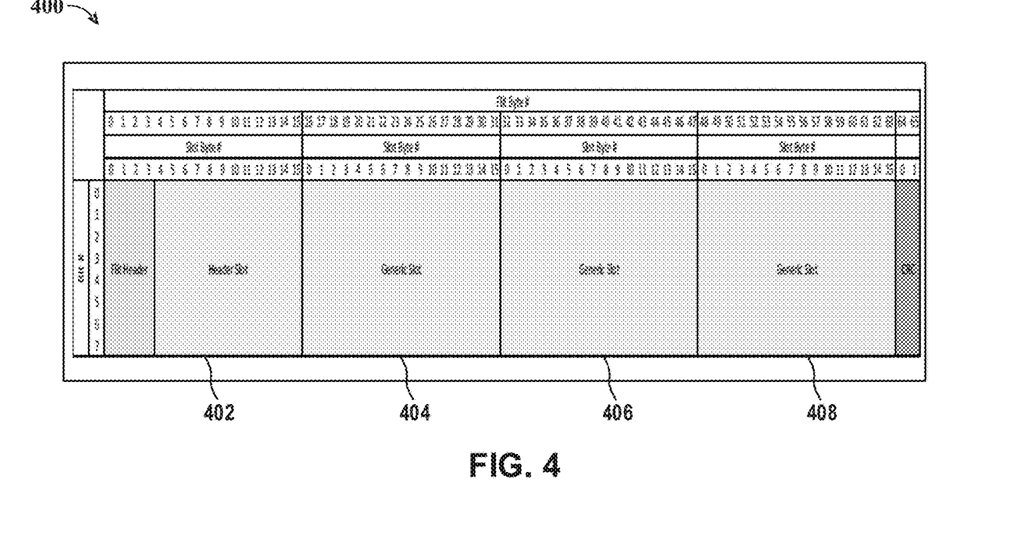
FIG. 4 is an example of a LL packet format.

FIG. 4 is an example of a data overview of a LL packet 400. The LL packet 400 can be representative of the LL packet 210, as shown in FIG. 2. Therefore, the following description of FIG. 4 can also refer to FIGS. 1-3. In some examples, the LL packet 400 can be referred to as a LL flit. As shown in the example of FIG. 4, the LL packet 400 can include a first slot 402, a second slot 404, a third slot 406, and a fourth slot 408. Each of the slots 402, 404, 406, and 408 can be 16 bytes and each byte can be 8 bits. At least some of the bytes of the first slot 402 can be used for flit header information (identified as "Flit Header" in the example of FIG. 4).

As described herein, the channel arbitrator 120, as shown in FIG. 1 or the channel arbitrator 202, as shown in FIG. 2, or the channel arbitrator 332, as shown in FIG. 3, can be employed for packing TL packets (e.g., the TL packets 204, 206, and 228, as shown in FIG. 2) with CXL messages into a respective slot, such as one of the slots 402, 404, 406, and 408. By packing the TL packets into the respective slot rather than packing one of the TL packets into the respective slot and a subsequent TL packet into another slot as existing TL packing techniques improves a data transfer efficiency of a data link (e.g., the CXL link 334, as shown in FIG. 3). As described herein, the channel arbitrator 120 can be configured to determine a slot format for each of the slots 402, 404, 406, and 408. The slot format determined by the channel arbitrator 120 can identify or determine how data is organized and thus how fields (e.g., which are a number of bits) within each slot are organized for storing the data, such as messages, as described herein. The different slot formats that respective slots of the LL packet 400 can have can be identified in a slot format database (e.g., the slot format database 222, as shown in FIG. 2).

Figure 5:
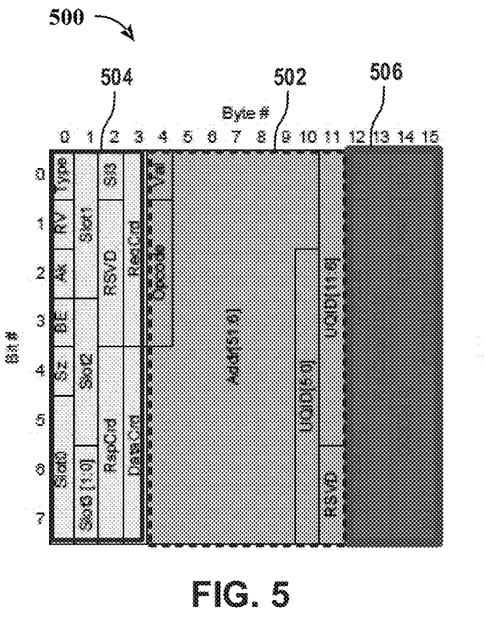
FIG. 5 is an example of a slot of a LL packet packed according to a slot arbitration method.
Figure 6:
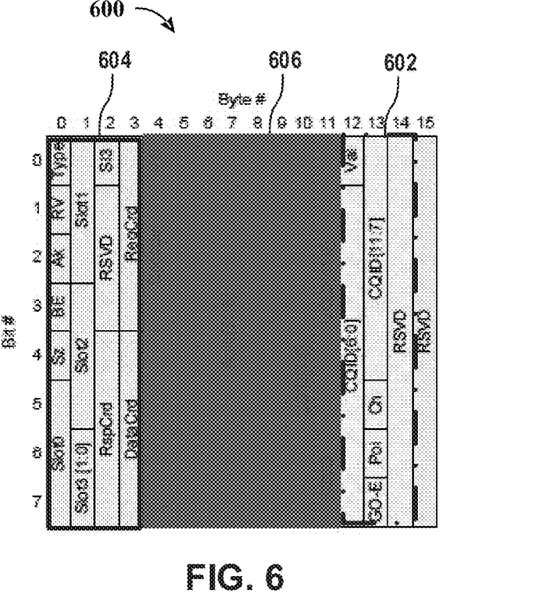
FIG. 6 is an example of another slot of a LL packet packed according to a slot arbitration method.

FIGS. 5-6 are examples of slots 500 and 600 of a LL packet packed based on a slot arbitration method. In the slot arbitration method, the slots 500 and 600 are packed with respective TL packets 502 and 602. The TL packets 502 and 602 can be packed with messages (e.g., a response, a request, or data) that have been provided using a similar CXL protocol. During the slot arbitration method, a WRR channel module can be configured to determine a slot format for each of the slots 500 and 600 for packing the slots 500 and 600 with available TL packets, such as the TL packets 502 and 602. A first number of data fields of each slot 500 and 600 as defined by a respective slot format can be used for packing a respective one of the TL packets 502 and 602, as shown in FIGS. 5-6, respectively.

In some examples, during the slot arbitration method, a second number of data fields of each slot 500 and 600 as defined by the respective slot format can be used for packing other LL information 504 and 604, as shown in respective FIGS. 5-6. During the slot arbitration method, a third number of data fields of each of the slots 500 and 600 are packed with 0's 506 and 606, as shown in respective FIGS. 5-6. A respective number of bytes of each of the slots 500 and 600 corresponding to one of the first, second and third number of data fields can be used for the packing of data (e.g., such as the TL packets 502 and 602, the other LL information 504 and 604, and the 0's), as shown in FIGS. 5-6. Accordingly, the slot arbitration method packs respective TL packets 502 and 504 with messages (that have been provided using a similar CXL protocol into two different slots 500 and 600 of the LL packet, thereby wasting transportation bandwidth in contrast to a channel arbitration method described herein.

Figure 7:
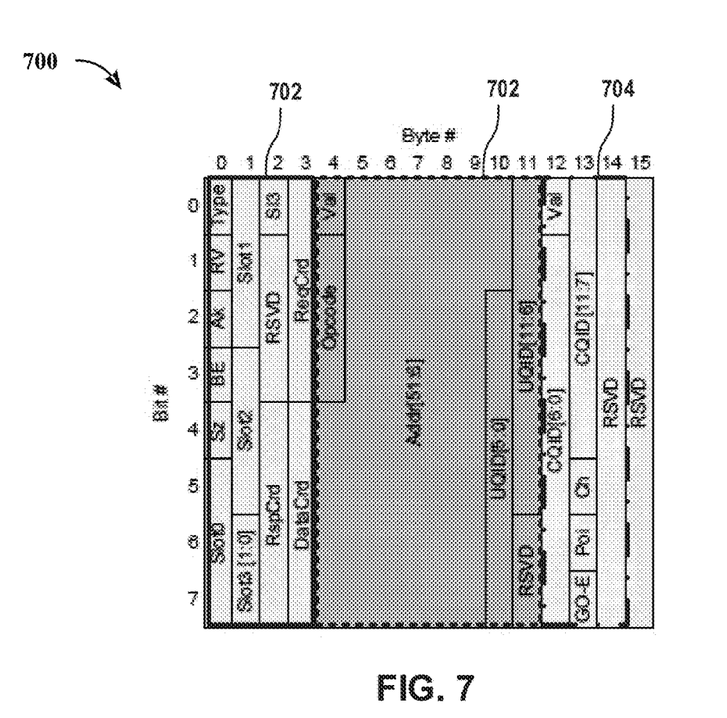
FIG. 7 is an example of a slot of a LL packet packed according to a channel arbitration method.

FIG. 7 is an example of a slot 700 of a LL packet packed according to the channel arbitration method described herein. The channel arbitration method can be implemented by the channel arbitrator 120, as shown in FIG. 1, the channel arbitrator 202, as shown in FIG. 2, or the channel arbitrator 332, as shown in FIG. 3. Therefore, the following description of FIG. 7 can also refer to FIGS. 1-4. The LL packet can correspond to the LL packet 210, as shown in FIG. 2. According to the channel arbitration method, the channel arbitrator 120 as described herein can pack respective TL packets 702 and 704 into the respective slot 700 of the LL packet during LL packet generation (e.g. by the packet generator 226, as shown in FIG. 2). The respective TL packets 702 and 704 can include messages (e.g., a response, a request, or data) that have been provided using a similar CXL protocol. In some examples, the TL packet 702 can be the TL packet 502, as shown in FIG. 5, and the TL packet 704 can be the TL packet 602, as shown in FIG. 6.

As shown in the example of FIG. 7, a first and second number of data fields of the slot 700 as defined by a respective slot format can be used by the channel arbitrator 120 for packing the TL packets 702 and 704 respectively therein. In some examples, as shown in the example FIG. 7, a third number of data fields of the slot 700 as defined by the respective slot format can be used by the channel arbitrator as described herein for packing other LL information 706. By implementing the channel arbitration method as described herein, the TL packets 702 and 704 can be more tightly packed in contrast to the slot arbitration method which packs the TL packets 502 and 602 loosely corresponding to packing the TL packets 502 and 602 in different slots 500 and 600 of the LL packet. Because the channel arbitrator as described herein tightly packs the TL packets 702 and 704 into a respective slot during LL packet generation improves a data transfer efficiency of the link (e.g., the CXL link 334, as shown in FIG. 3) as no idling data (e.g., the zeros 506 and 606) is transmitted in the slot 700 as in the slots 506 and 606.

Figure 8:
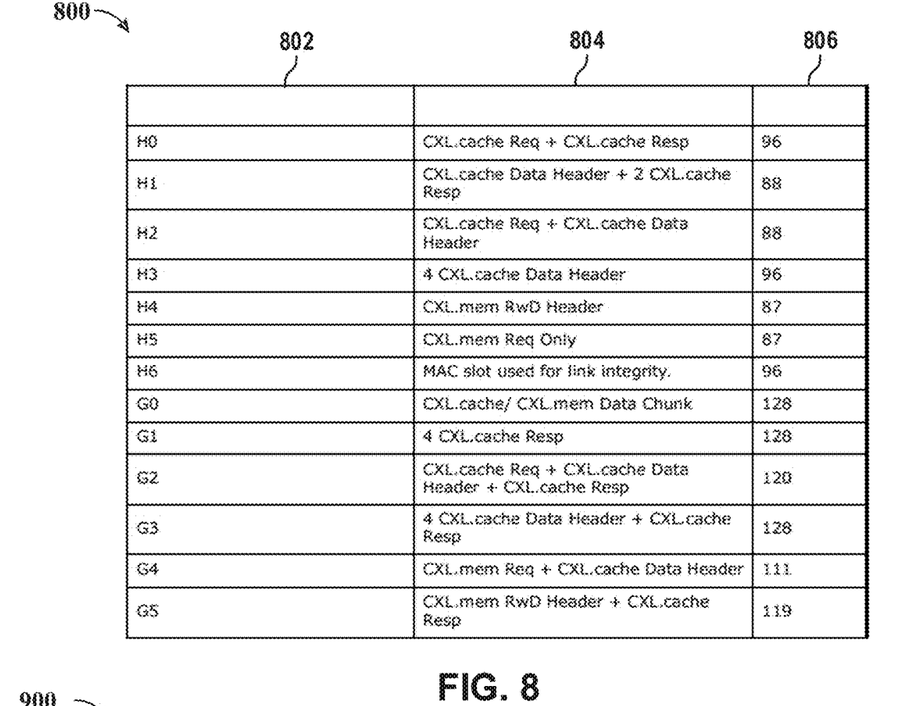
FIG. 8 is an example of a table identifying different slot formats for packing TL packets.

FIG. 8 is an example of a table 800 identifying different slot formats for packing TL packets having messages (e.g., a response, a request, or data) that have been provided according to a CXL protocol, such as a CXL.mem and CXL.cache protocols described herein. The table 800 can be stored as part of a slot format database, such as the slot format database 222, as shown in FIG. 2. Therefore, the following description of FIG. 8 can also refer to FIGS. 1-4 and 7. The table 800 can include a first column 802, a second column 804, and a third column 806. The first column 802 can identify different slot formats for a respective slot of LL packet, such as the LL packet 210, as shown in FIG. 2. By way of example, a slot format identified as "H0" in the first column 802 can be representative of the slot format of the slot 700, as shown in the example of FIG. 7.

The second column 804 of the table 800 can identify different message types provided using the CXL protocol that can be packed into a respective slot according to a respective slot format of the first column 802. For example, a first entry of the second column 804 indicates that CXL.cache messages (e.g., "CXL.cache Req+CXL.cache Resp" as shown in FIG. 8) can be packed into a slot having the slot format identified as "H0" in the first column 802. As described herein, the CXL.cache messages can be provided using a similar CXL protocol, and thus via a CXL.cache request channel and a CXL.cache response channel. The third column 806 of the table indicates a total size of the different message types identified by the second column 804. For example, the CXL.cache messages of the first entry of the second column 804 can be in total 98 bits. For example, the respective slot format (e.g., the slot format identified as "H" in the first column 802) can identify a number of data fields of the respective slot that have a sufficient number of bits to support the packing of the CXL.cache message. The number of data fields of the respective slot available for packing can be defined by a respective slot format. As described herein, the channel arbitrator can pack the CXL.cache messages into the identified data fields and thus improve a data transfer efficiency of a link (e.g., a CXL link) between the devices 104 and 110 by avoiding the transmission of idling data in slots, such as shown in FIGS. 5-6.

Figure 9:
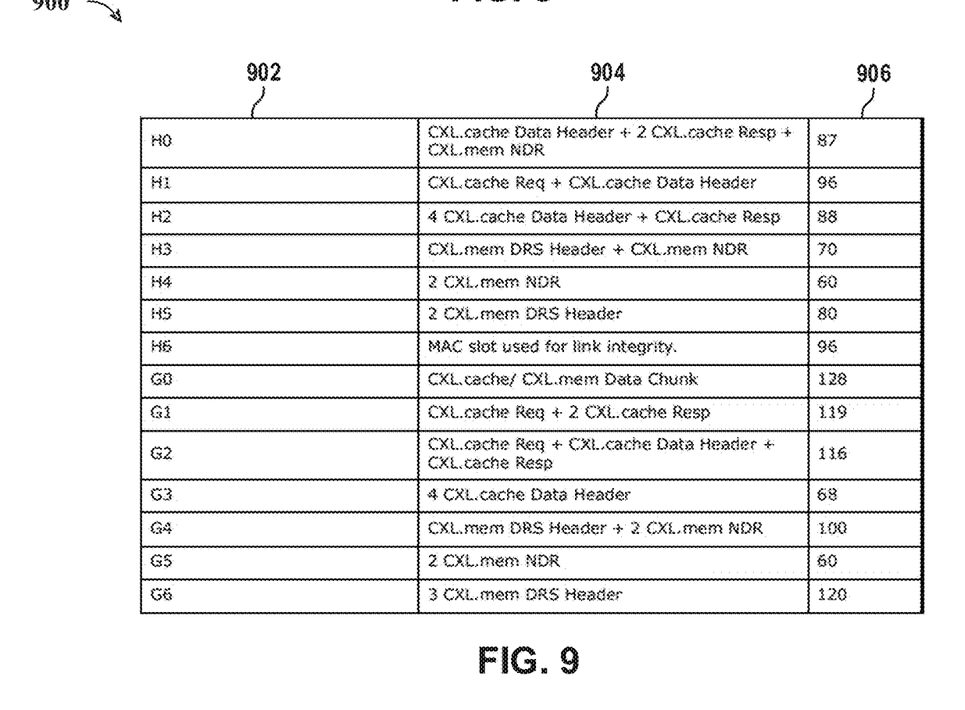
FIG. 9 is an example of another table identifying different slot formats for packing TL packets.

FIG. 9 is an example of a table 900 identifying different slot formats for packing TL packets having messages (e.g., a response, a request, or data) that have been provided according to a CXL protocol, such as a CXL.mem and CXL.cache protocols described herein. The table 900 can be stored as part of a slot format database, such as the slot format database 222, as shown in FIG. 2. Therefore, the following description of FIG. 9 can also refer to FIGS. 1-4 and 7. The table 900 can include a first column 902, a second column 904, and a third column 906. The first column 902 can identify different slot formats for a respective slot of an LL packet, such as the LL packet 210, as shown in FIG. 2. By way of example, a slot format identified as "H0" in the first column 902 can be representative of the slot format of the slot 700, as shown in FIG. 1.

The second column 904 of the table 900 can identify different message types provided using the CXL protocol that can be packed into a respective slot according to a respective slot format of the first column 902. For example, a first entry of the second column 904 indicates that CXL.cache and CXL.mem messages (e.g., "CXL.cache Data Header+2 CXL.cache Resp+CXL.mem NDR" as shown in FIG. 9) can be packed into a slot having the slot format identified as "H0" in the first column 902. As described herein, the CXL.cache and CXL.mem messages can be provided using a similar CXL protocol (e.g., via respective CXL.cache and CXL.mem protocols), and thus via at least one CXL.cache and CXL.mem channel. The third column 906 of the table indicates a total size of the different message types identified by the second column 904. For example, the CXL.cache and CXL.mem messages of the first entry of the second column 904 can collectively be 87 bits. For example, the respective slot format (e.g., the slot format identified as "H0" in the first column 902) can identify a number of data fields of the respective slot that have a sufficient number of bits to support packing of the CXL.cache and CXL.mem messages into the respective slot. The number of data fields of the respective slot available for packing can be defined by a respective slot format, which can be stored in the slot format database 222, as shown in FIG. 2. As described herein, the channel arbitrator can pack the CXL.cache and CXL.mem messages into the identified data fields and thus improve a data transfer efficiency of a link (e.g., a CXL link) between the devices 104 and 110 by avoiding the transmission of idling data in slots, such as shown in FIGS. 5-6.

Figure 10:
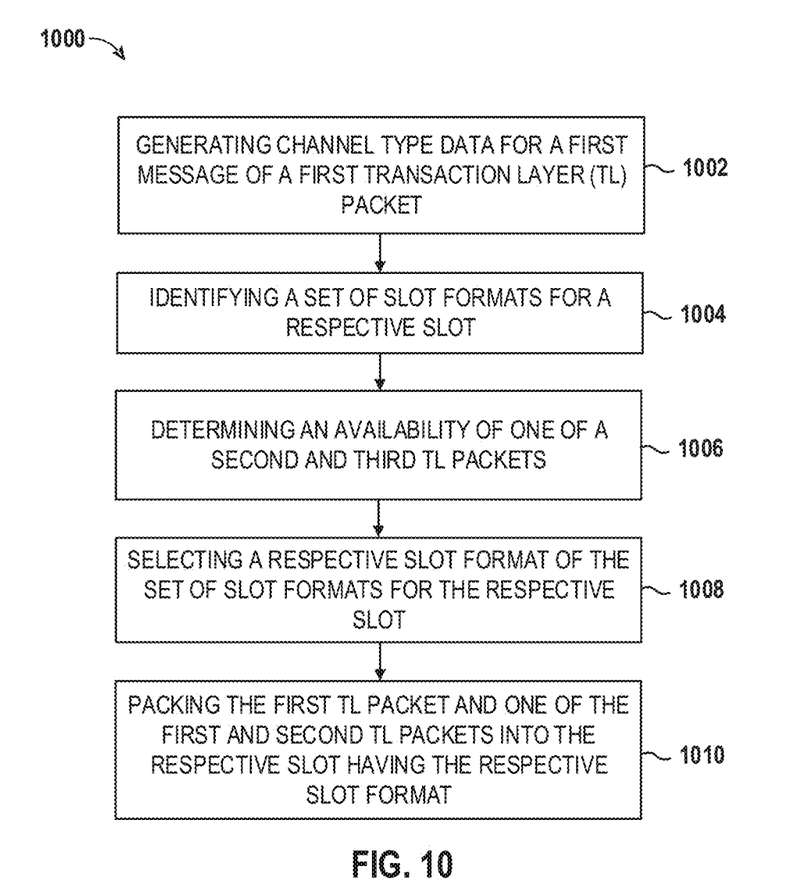
FIG. 10 is an example of a method for packing TL packets during LL packet generation.

In view of the foregoing structural and functional features described above, an example method will be better appreciated with references to FIG. 10. While, for purposes of simplicity of explanation, the example method of FIG. 10 is shown and described as executing serially, it is to be understood and appreciated that the example method is not limited by the illustrated order, as some actions could in other examples occur in different orders, multiple times and/or concurrently from that shown and described herein.

FIG. 10 is an example of a method 1000 for packing TL packets during LL packet generation. The method 1000 can be implemented by a channel arbitrator, such as the channel arbitrator 120, as shown in FIG. 1, the channel arbitrator 202, as shown in FIG. 2, or the channel arbitrator 332, as shown in FIG. 3. Therefore, the following description of FIG. 10 can also refer to FIGS. 1-4 and 7-9. The method 1000 can begin at 1002 by generating channel type data identifying a type of message channel for a first message. The channel type data can be generated by the channel scheduler 216, as shown in FIG. 2. At 1004 a set of slot formats for a respective slot can be identified (e.g., by the slot format identifier 212, as shown in FIG. 2) for packing a first TL packet that includes the first message based on an evaluation of the channel type data relative to a slot format database.

At 1006, an availability of one of a second and a third TL packet that includes a respective second and third message for packing into the respective slot can be determined (e.g., by the slot format identifier 212, as shown in FIG. 2). At 1008, a respective slot format of the set of slot formats can be selected (e.g., by the slot format identifier 212, as shown in FIG. 2) for the respective slot based on a message type of the first message and a message type of one of second and third messages. At 1110, the first TL packet and one of the second and third TL packets can be packed (e.g., by the packet generator 226, as shown in FIG. 2) into the respective slot having the selected respective slot format during generation of a LL packet.

As used herein, the term "circuit" can include a collection of active and/or passive elements that perform an electronic circuit function, such as an analog circuit and/or digital circuit. Additionally or alternatively, for example, the term "circuit" can include an IC where all or some of the circuit elements are fabricated on a common substrate (e.g., semiconductor substrate, such as a die or chip) or within a common package herein. For example, circuitry, as described herein, can be implemented on one or more semiconductor substrates. Additionally, the term "couple" is used throughout the specification. The term may cover connections, communications, or signal paths that enable a functional relationship consistent with the description of the present disclosure. For example, if device A generates a signal to control device B to perform an action, in a first example device A is configured to device B, or in a second example device A is configured to device B through intervening component C if intervening component C does not substantially alter the functional relationship between device A and device B such that device B is controlled by device A via the control signal generated by device A.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A channel arbitration method comprising:
generating channel type data identifying a type of message channel for a first transaction layer (TL) packet, wherein the channel type data identifies the type of message channel as a cache channel type or as a memory channel type;
identifying a set of slot formats for a slot for packing the first TL packet based on an evaluation of the channel type data relative to a slot format database;
determining an availability of a second TL packet for packing into the slot;
selecting a respective slot format of the set of slot formats for the slot based on a message type of the first TL packet and a message type of the second TL packet; and
packing the first TL packet and the second TL packet into the slot having the selected respective slot format during a generation of a single link layer packet, wherein the packing causes the single link layer packet to include both the first TL packet and the second TL packet.

2. The channel arbitration method of claim 1, further comprising evaluating message channel information identifying a message channel for the first TL packet relative to the channel type data to determine a type of TL packet for the first TL packet.

3. The channel arbitration method of claim 2, further comprising identifying the set of slot formats for the slot based on the type of TL packets for the first TL packet.

4. The channel arbitration method of claim 3, wherein the slot format database identifies different slot formats for different message types.

5. The channel arbitration method of claim 4, wherein identifying the set of slot formats for the slot comprises comparing the message type of the first TL packet to the slot format database to identify the set of slot formats associated with the message type of the first TL packet in the slot format database.

6. The channel arbitration method of claim 5, further comprising comparing the message type of the second TL packet to the slot format database to identify first and second slot formats from the set of slot formats associated with the message type of the second TL packet in the slot format database, wherein the slot format is the first slot format.

7. The channel arbitration method of the claim 1, wherein the slot format database comprises a first slot format associated with the message type of the first TL1 packet and a second slot format associated with the message type of the second TL, packet.

8. The channel arbitration method of claim 7, further comprising:
providing to a channel scheduler a priority request identifying first and second message channels for respective second and third TL packets; and
receiving channel priority data identifying one of the first and second message channels as having a greater channel priority than a remaining message channel of the first and second message channels.

9. The channel arbitration method of claim 8, wherein selecting the respective slot format comprises selecting the first slot format as the respective slot format based on the priority data identifying the second message channel having a greater priority than the first message channel.

10. The channel arbitration method of claim 8, wherein the first TL packet is a first compute express link (CXL) message and the second TL packet is a second CXL message, the first CXL message being a first type of CXL cache or memory message, and the second CXL message being a second type of CXL cache or memory message.

11. The channel arbitration method of claim 8, wherein selecting the respective slot format comprises selecting the second slot format as the respective slot format based on the priority data identifying the first message channel having a greater priority than the second message channel.

12. The channel arbitration method of claim 8, wherein the link layer packet is a flit, and the method further comprising transmitting the flit across a link to a receiving device.

13. A system comprising:
a processor; and
a protocol stack configured to: receive first and second messages from the processor; generate first and second transaction layer (TL) packets based on respective first and second messages; evaluate message channel information identifying a message channel for the first TL packet relative to channel type data to determine a channel type of TL packet for the first TL packet, wherein the message channel information identifies the channel type of TL packet for the first TL packet as a cache channel type or as a memory channel type;
identify a set of slot formats for the respective slot in response to determining that the first TL packet is a respective type of TL packet;
select a respective slot format of the set of slot formats for a respective slot for packing the first and second TL packets during flit generation based on a message type of the first and second TL packets;
generate a single flit comprising a set of slots, wherein the set of slots include the respective slot having the respective slot format and is packed with the first and second TL packets, wherein packing the first TL packet and the second TL packet into the respective slot causes the single flit to include both the first TL packet and the second TL packet; and
transmit the flit cross a lane of a lock to a receiving device.

14. The system of claim 13, wherein to protocol stack is configured to compare the message type of the first TL packet to the slot format database to identify the set of slot formats associated with the message type of the first TL packet in the slot format database, wherein the slot format database comprises a second slot format associated with the message type of the second TL packet.

15. The system of claim 14, wherein the protocol stack is configured to:
  evaluate the second TL packet to determine the message type of the second message; and
  compare the message type for the second TL packet to the slot format database to identify first and second slot formats from the set of slot formats associated with the message type of the second TL packet in the slot format database, wherein the respective slot format is the first slot format.

16. A system comprising:
  a protocol stack comprising:
    a transaction layer (TL) configured to receive first, second, and third messages and packetize the messages to provide first, second, and third TL packets comprising a respective one of the first, second, and third messages;
    a link layer comprising a channel arbitrator, wherein the channel arbitrator comprises:
    a channel scheduler configured to generate channel type data identifying a type of message channel for the first TL packet, wherein the channel type data identifies the type of message channel as a cache channel type or as a memory channel type;
    a slot format identifier configured to:
      identify a set of slot formats for a respective slot based on an evaluation of the channel type data relative to a slot format database;
      determine an availability of one of the second and third TL packet;
      select a respective slot format of the set of slot formats for the respective slot based on a message type of the first message and further based on a message type of the second message or the message type of the third message; and
      generate slot packing data identifying the selected respective slot format and respective TL packets for packing into the respective slot, wherein the respective TL packets include the first TL packet and one of the second TL packet or the third TL packet;
    a packet generator configured to generate a single link layer (LL) packet comprising a set of slots that include the respective slot having the selected respective slot format, the packet generator being configured during the generation of the single LL packet to pack the first TL packet and one of the second packet or the third TL packet into the respective slot based on the slot packing data, wherein the packing causes the single LL packet to include both the first TL packet and the second TL packet; and
  a physical layer configured to transmit the single LL packet across a link to a device.

17. The system of claim 16, wherein:
  the slot identifier is further configured to generate a priority request identifying first and second message channels for respective second and third messages, and
  the channel scheduler is configured to generate channel priority data identifying one of the first and second message channels as having a greater channel priority than a remaining message channel of the first and second message channels.

18. The system of claim 17, further comprising the slot format database, the slot format database comprising a first slot format associated with the message type of the second TL packet and a second slot format associated with the message type of the third TL packet, wherein the message type of the first TL packet is associated with both of the first and second slot formats in the slot format database, and wherein the slot format identifier is configured to select the first slot format as the respective slot format based on the message type of the first and second TL packets and the priority data identifying the first message channel having a greater priority than the second message channel.

19. The channel arbitration method of claim 1, wherein the channel type data identifies the type of message channel as a cache channel type, and further identifies the type of message channel as one of a cache request channel type, a cache response channel type, or a cache data channel type.

20. The system of claim 13, wherein the message channel information identifies the channel type of TL packet for the first TL packet as a cache channel type, and further identifies the type of channel type of TL packet for the first TL packet as one of a cache request channel type, a cache response channel type, or a cache data channel type.

* * * * *